United States Patent [19]
Higgins et al.

[11] Patent Number: 5,567,257
[45] Date of Patent: Oct. 22, 1996

[54] METHOD FOR FORMING HEAT STABILIZED PILE FABRIC

[75] Inventors: Kenneth B. Higgins, LaGrange, Ga.; Benjamin A. Gaddis, Clemson, S.C.

[73] Assignee: Milliken Research Corporation, Spartanburg, S.C.

[21] Appl. No.: 450,023

[22] Filed: May 25, 1995

Related U.S. Application Data

[60] Division of Ser. No. 91,309, Jul. 14, 1993, Pat. No. 5,443,881, which is a continuation-in-part of Ser. No. 674,427, Mar. 22, 1991, abandoned, which is a continuation of Ser. No. 457,612, Dec. 27, 1989, abandoned.

[51] Int. Cl.$^6$ ............................ D04H 11/00; B32B 31/18
[52] U.S. Cl. .......................................... 156/72; 156/308.2
[58] Field of Search .................................. 156/72, 308.2, 156/309.6; 428/952, 93, 94, 95

[56] References Cited

U.S. PATENT DOCUMENTS

| | | |
|---|---|---|
| Re. 31,826 | 2/1985 | Machell . |
| 1,887,477 | 11/1932 | Slater . |
| 2,101,905 | 12/1937 | Hopkinson . |
| 2,160,154 | 5/1939 | Kellogg et al. . |
| 2,512,727 | 6/1950 | Rice . |
| 3,332,828 | 7/1967 | Faria et al. . |
| 3,640,786 | 2/1972 | Carpenter . |
| 3,694,873 | 10/1972 | Crowley . |
| 3,723,213 | 3/1973 | Hoey . |
| 3,925,130 | 1/1975 | Brown . |
| 3,957,555 | 5/1976 | Bondi ................................ 156/72 |
| 4,010,303 | 3/1977 | Ramsauer et al. . |
| 4,010,308 | 3/1977 | Wiczer . |
| 4,018,699 | 4/1977 | Lindy . |
| 4,061,811 | 12/1977 | Takase et al. . |
| 4,191,799 | 4/1980 | Gruber . |
| 4,230,755 | 10/1980 | Morris . |
| 4,246,309 | 1/1981 | Daniel et al. . |
| 4,251,416 | 2/1981 | Palmer . |
| 4,482,593 | 11/1984 | Sagel et al. . |
| 4,513,042 | 4/1985 | Lumb . |
| 4,576,665 | 3/1986 | Machell . |
| 4,808,459 | 2/1989 | Smith et al. . |
| 4,842,915 | 6/1989 | Hartmann et al. . |
| 5,135,602 | 8/1992 | Wild . |
| 5,198,277 | 3/1993 | Hamilton et al. . |

FOREIGN PATENT DOCUMENTS

| | | |
|---|---|---|
| 0402664 | 12/1990 | European Pat. Off. . |
| 0435542 | 7/1991 | European Pat. Off. . |
| 0568916A1 | 11/1993 | European Pat. Off. . |
| 5147166 | 4/1976 | Japan . |
| 1136562 | 12/1968 | United Kingdom . |
| 1409068 | 10/1975 | United Kingdom . |
| 2225351 | 5/1990 | United Kingdom . |
| 90/00967 | 2/1990 | WIPO . |

OTHER PUBLICATIONS

Article: "U.S. Firm Adopts Scottish Fusion Bonding Technique", Wool Record, Aug. 1990—p. 25, Carpet.
German Article: "Balmoral Tuft Bonding Method for Producing Carpeting and Carpeting Elements" Chemiefasern/Textilindustrie, vol. 91, No. 39, Mar. 1989, pp. 268–274 (with Translation).

*Primary Examiner*—Jeff H. Aftergut
*Assistant Examiner*—Sam Chuan Yao
*Attorney, Agent, or Firm*—Terry T. Moyer; James M. Robertson

[57] ABSTRACT

A process for forming a bonded pile fabric of enhanced stability using low levels of adhesive is provided. In the process pile forming yarn is tacked by heat fusion an open weave base layer prior to the application of adhesive. The adhesive which is preferably a low viscosity latex is applied through an open weave base layer to further bond the pile. An apparatus for making the bonded pile fabric is also provided.

5 Claims, 6 Drawing Sheets

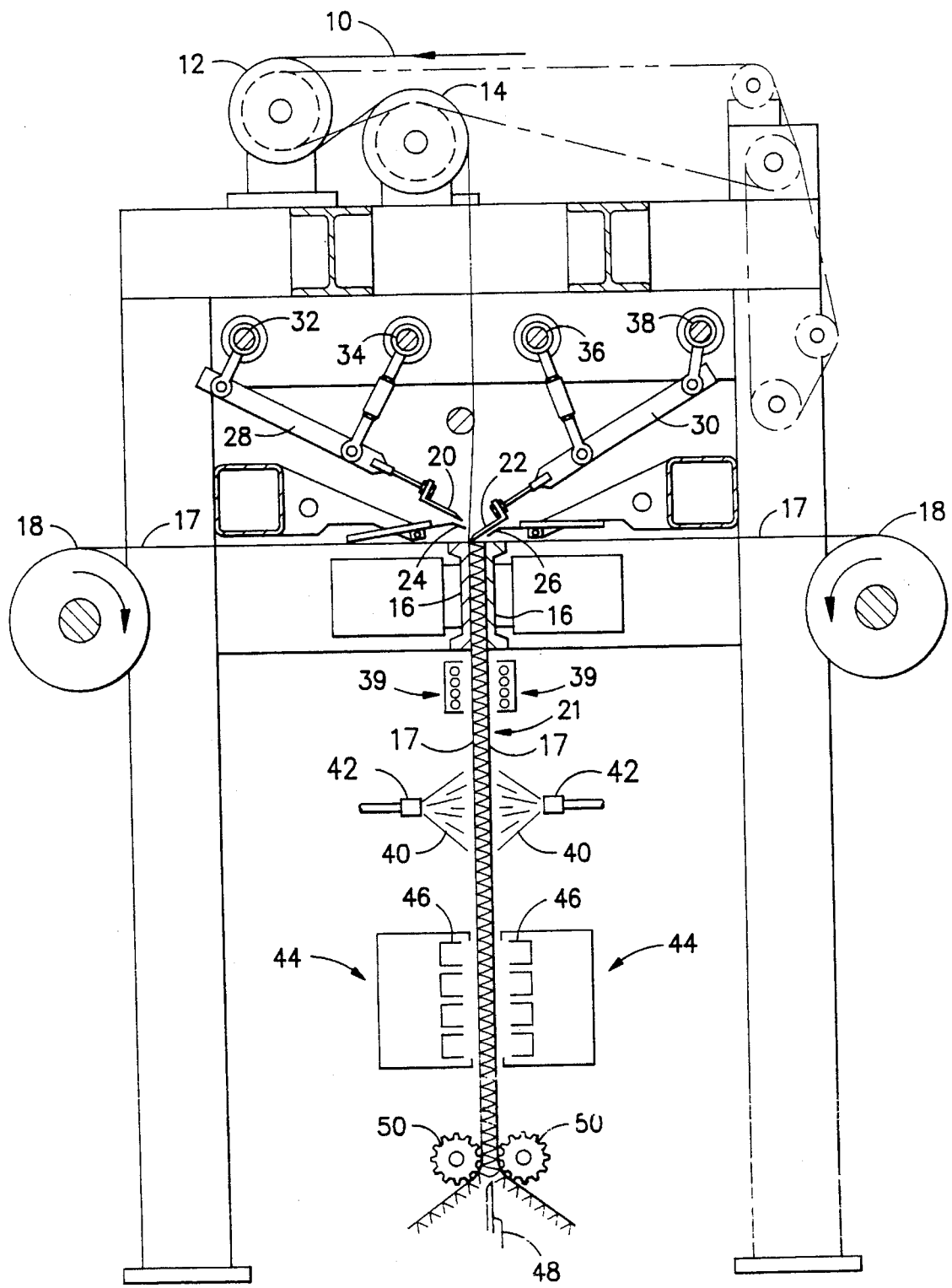
FIG. −1−

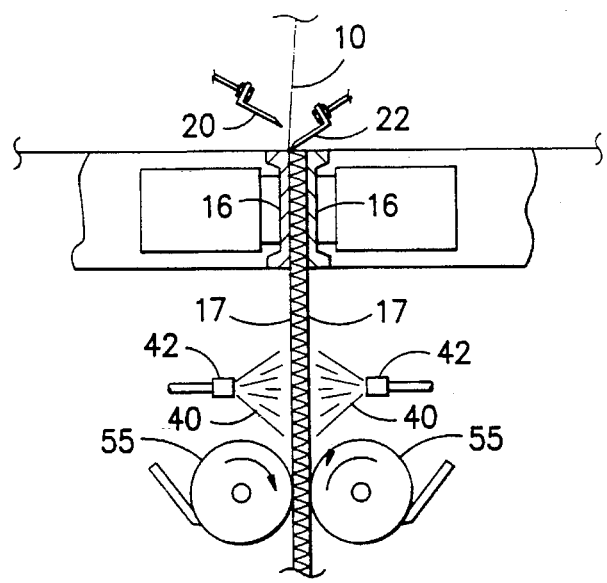
FIG. −1A−
PRIOR ART
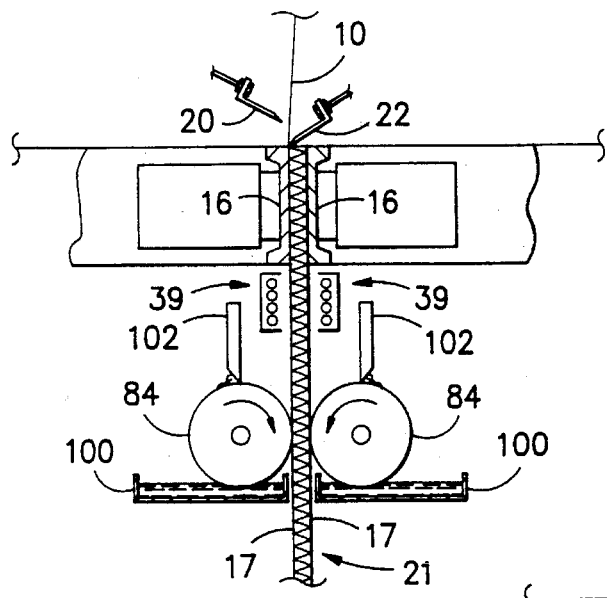
FIG. −2−
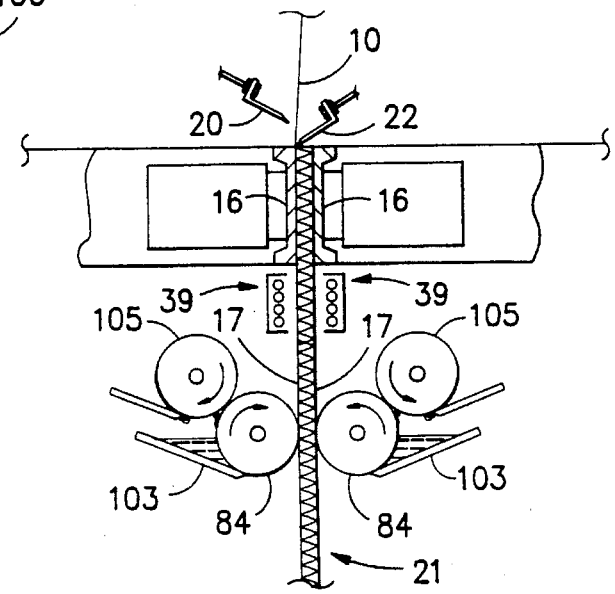
FIG. −3−

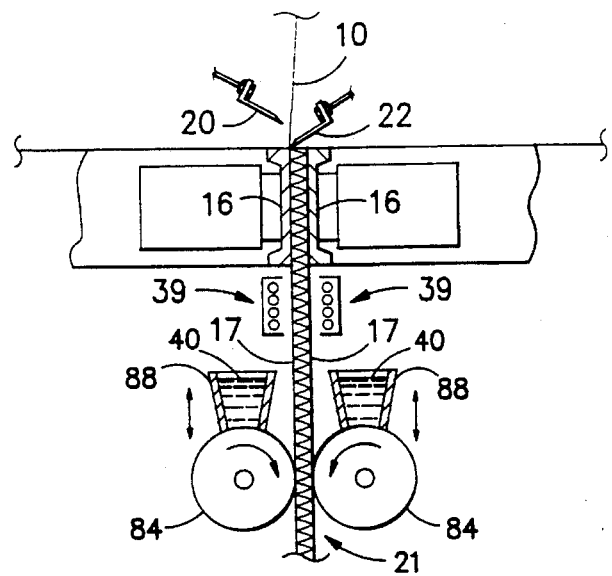
FIG. -4-
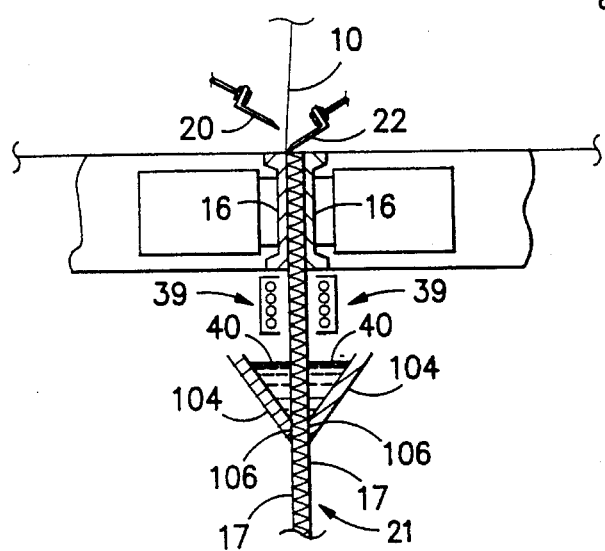
FIG. -5-
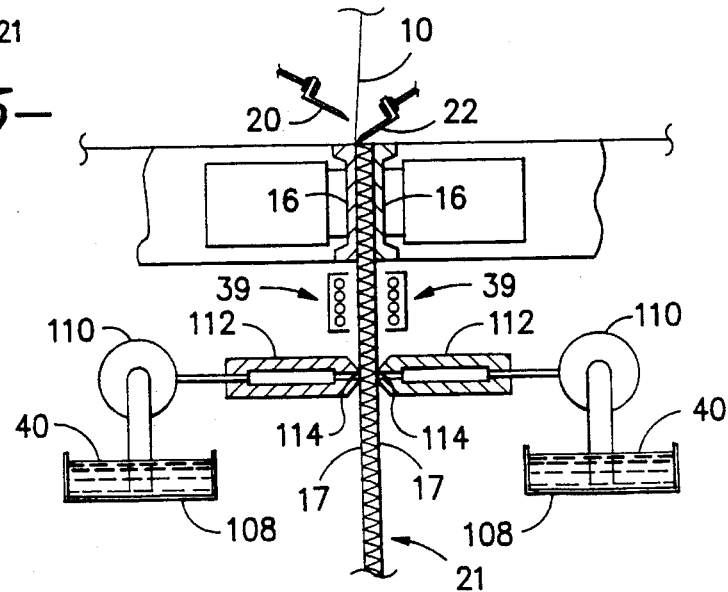
FIG. -6-

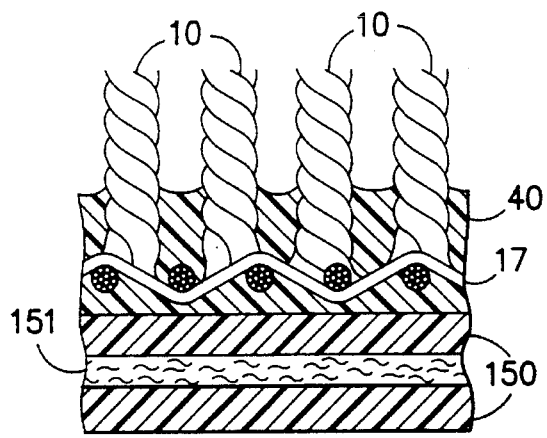
FIG. -7-
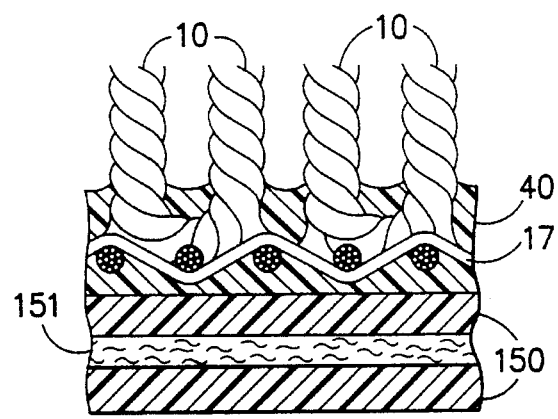
FIG. -8-
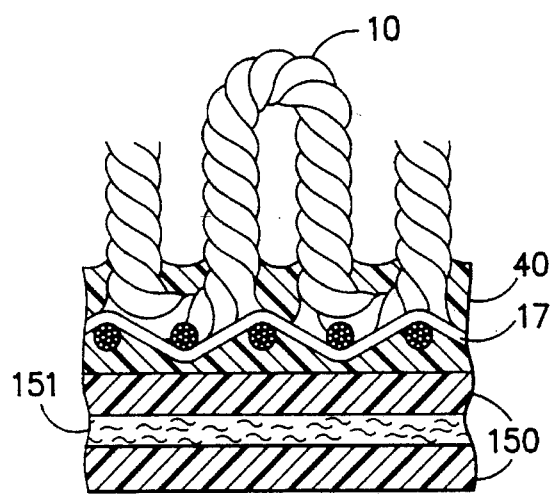
FIG. -9-
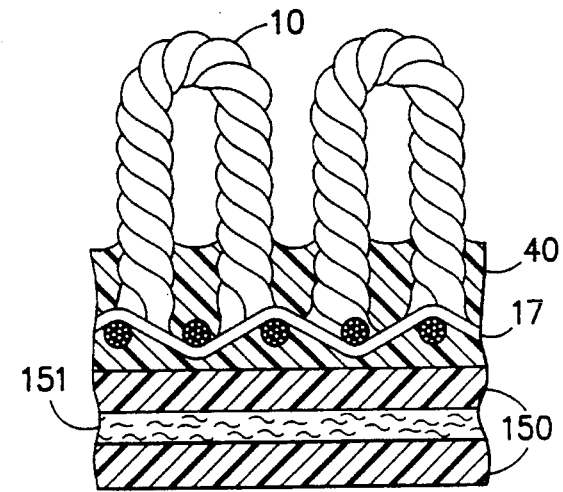
FIG. -10-

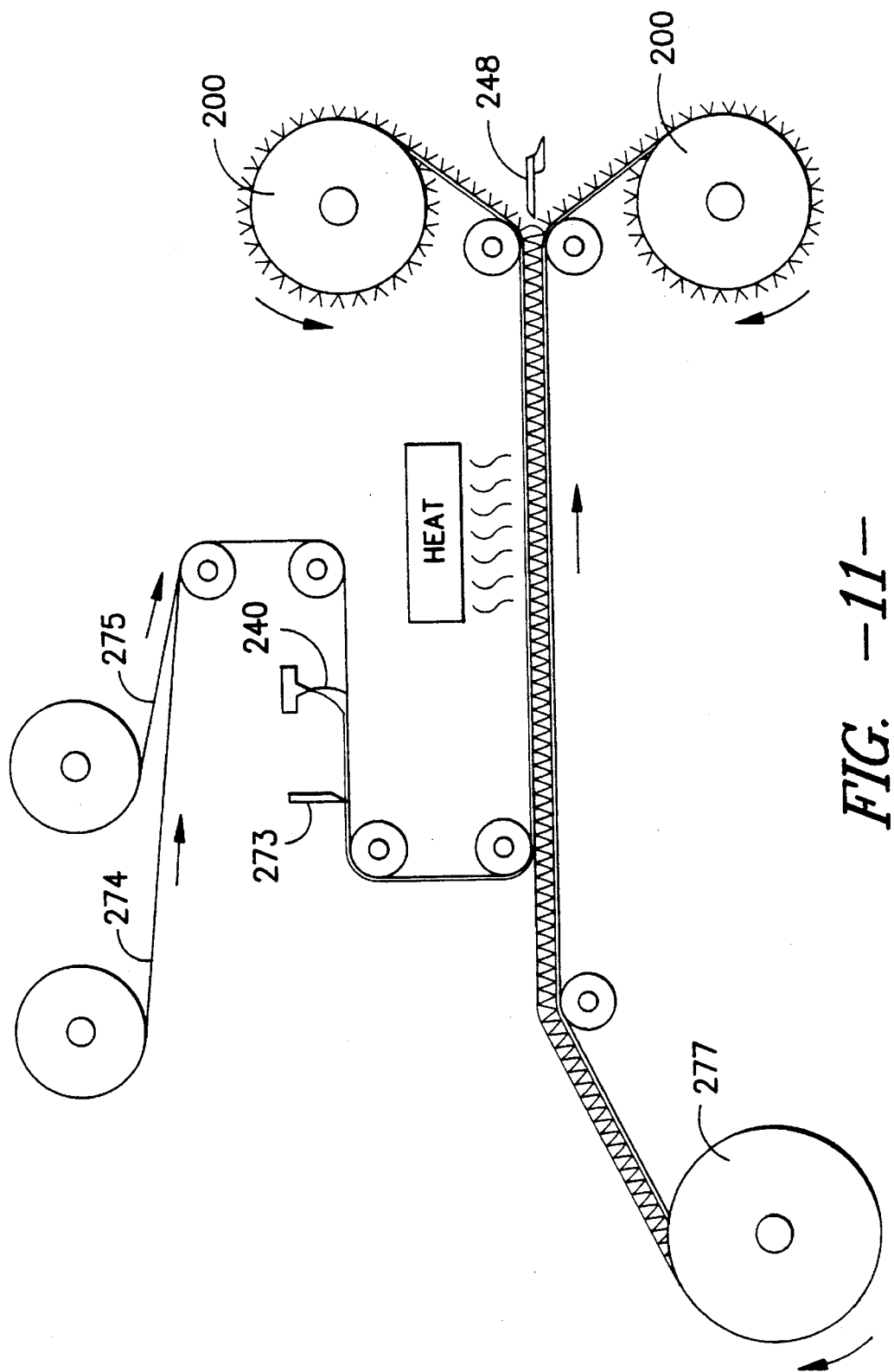
FIG. -11-
PRIOR ART

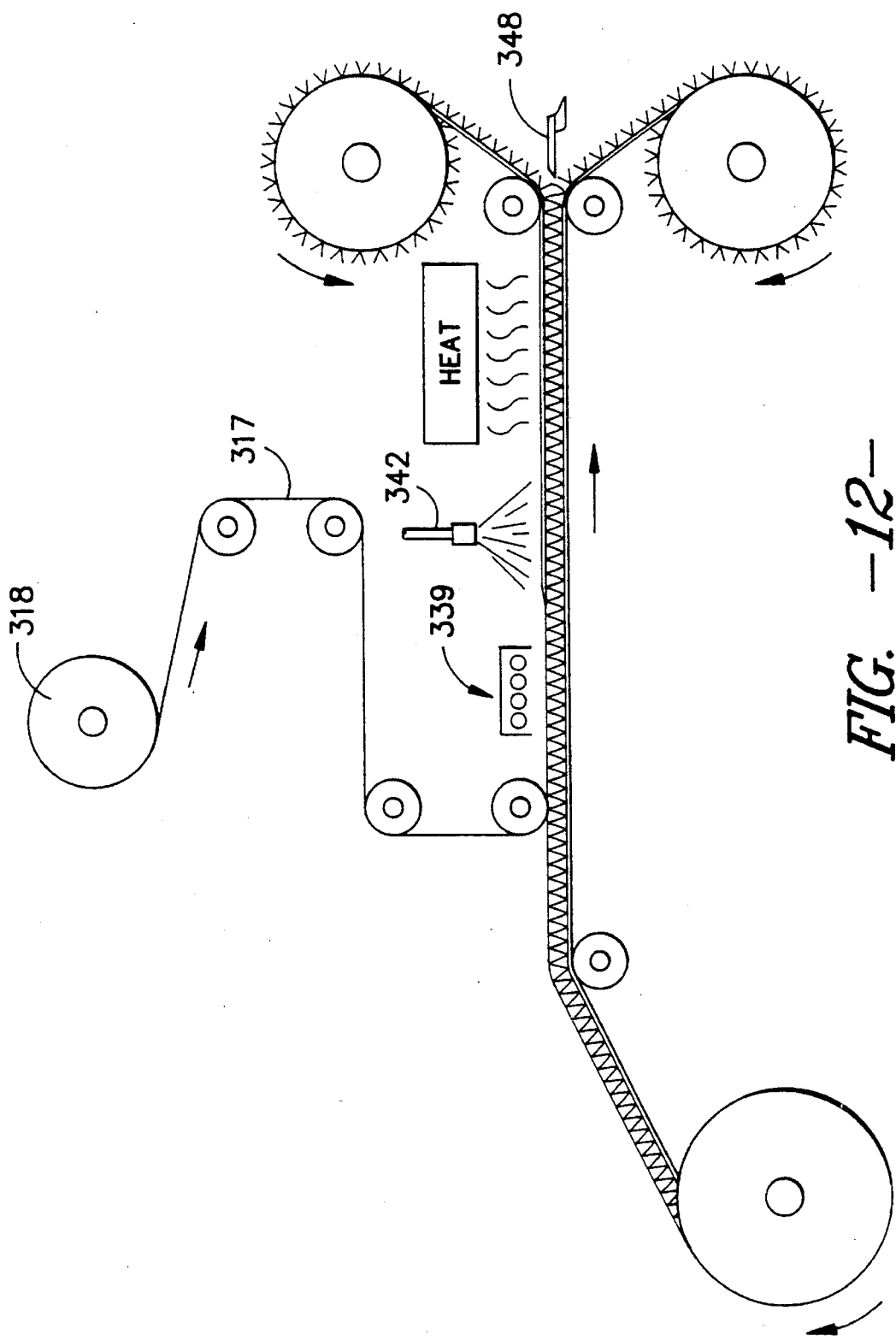
FIG. -12-

METHOD FOR FORMING HEAT STABILIZED PILE FABRIC

This is a division of application Ser. No. 08/091,309 filed Jul. 14, 1993, now U.S. Pat. No. 5,443,881 which is a continuation-in-part of application Ser. No. 07/674,427 filed Mar. 22, 1991, which in turn is a continuation of application Ser. No. 07/457,612 filed Dec. 27, 1989, now abandoned the contents of which having been published on Jul. 3, 1991 as European Patent Application No. 90313777.6.

The present invention relates to pile fabrics. More particularly, the present invention relates to adhesive bonded pile fabrics, especially latex adhesive bonded pile fabrics and latex adhesive bonded carpet tiles.

As will be appreciated by those of skill in the art, pile fabrics such as carpeting may be manufactured in several ways such as by weaving, tufting, needling or bonding. In each method the pile must be secured to a base or support layer in one way or another. The present invention is particularly concerned in one aspect with a method of manufacture wherein the pile is bonded by means of an adhesive, preferably latex, to a base layer following an initial tacking of the pile yarn to the base layer through application of heat. Such fabrics will herein be referred to variously as heat tacked adhesive bonded pile fabrics, or heat tacked adhesive bonded carpets.

A number of techniques have been used for the manufacture of bonded pile fabrics which involve pressing pile-forming lengths of yarn into an adhesive disposed across contact surface of a base layer. Prior commercial techniques for making bonded fabrics have typically relied on the use of polyvinyl chloride (PVC) plastisol formulations because of the processing disadvantages thought to be associated with the use of other adhesive formulations such as hot melt and latex adhesive systems. According to such techniques a polyvinyl chloride plastisol is applied to the base layer prior to positioning the pile-forming yarn relative to the base layer. Then the pile yarn may be positioned into contact with the base layer and the plastisol may then be fused or cured, typically by heating. When attempts were made to substitute other adhesives, such as hot melt adhesives for the PVC plastisol in this process difficulties were encountered. Thus, for instance, with regard to hot melt adhesives, it has generally been thought that the apparatus employed for positioning the yarn may become coated with the adhesive requiring frequent shutdowns of the apparatus for cleaning. It has also been thought that such adhesives could exhibit premature cooling prior to yarn implantation. As will be appreciated, such operational difficulties are commercially unattractive.

A disadvantage typically associated with the prior art techniques for making bonded or non-tufted pile fabrics, that is fabrics where the pile yarn is not tufted through the backing but simply adhered to the backing, is that the adhesive is normally applied to the base layer on the side of the base layer facing the pile yarns, and the base layer is normally of a construction such that the adhesive will not flow through it but will substantially remain on that surface with perhaps some penetration into the base layer. Then, if it is desired to apply a backing layer, e.g., a hard back, to the back side of the pile fabric as may be desired in the making of carpet tiles the base layer must be either adhered directly to the backing layer or an additional process step of applying adhesive to the back side of the base layer may be necessary. In either event, there are created numerous distinct layers in the finished product, namely pile layer, adhesive layer, base layer, another adhesive layer and a hard back layer. Such constructions may inherently have processing disadvantages and be costly to construct.

According to Machell U.S. Pat. RE No. 31,826 (incorporated by reference), bonded pile fabrics are provided wherein the bonding of the pile-forming yarn to the base layer may be accomplished by means of a hot melt adhesive. A process and apparatus are also disclosed therein where the hot melt adhesive is applied to a liquid-permeable layer from the back of the base layer and it may be forced through the base layer so that a one step adhesive layer application may both provide a means for bonding the pile yarn to the base layer and also provide a means by which a backing layer may be integrally affixed to the base layer. The resulting product may be less complicated and costly to manufacture and may have fewer separate and distinct layers in the final product where undesired separation may occur.

While the present invention may utilize any adhesive which may be applied through a permeable base layer including hot melt adhesives as disclosed in U.S. Pat. RE No. 31,826 or polyvinyl chloride plastisol formulations, it is contemplated that the use of latex adhesives may be preferred. As contrasted to conventional bonded carpet tiles, water-based latex adhesive backed tiles are generally easier to cut both in the production process and during installation. Latex adhesive based products typically also have a relatively soft hand and are, therefore, easy to handle as compared to conventional products. As will be recognized, these beneficial characteristics of easy cutting and handling which are associated with the use of a water-based latex adhesive can be enhanced through optimization of the amount of adhesive which is, in fact, applied. In general, these characteristics, as well as the cost of production, can be improved by minimizing the amount of adhesive which must be applied while at the same time maximizing yarn penetration to effect the requisite degree of bonding strength between the pile yarn and the base layer.

The pile fabrics of the present invention are heat tacked adhesive bonded fabrics which may be comprised of a liquid-permeable base layer, a pile forming yarn adjacent to but not tufted through the base layer, in pile forming, preferably folded, fashion; the pile forming yarn having been bonded to the base layer by means of an adhesive applied following a heat actuated tacking of the pile forming yarn to the base layer. Preferably, the heat actuated tacking is effected by means of a non-contact heat exchange between the pile fabric and external heating sources which slightly melts the yarn to the base layer. After the yarn is meltable tacked to the base layer, the adhesive is applied through the back of the base layer into contact with the pile forming yarn. This adhesive is preferably a water-based latex of low viscosity which can be applied at room temperature, although, as previously indicated, other adhesives may be utilized.

As will be discussed more fully below, the heat actuated tacking of the pile forming yarn to the base layer provides a degree of enhanced stability between the yarn and the base layer. This heat tacking may lead to improved uniformity especially when the product is formed by yarn folding. The tacking process also provides a degree of preheat to the fabric which is useful in facilitating adhesion and enhancing penetration control by means of the very low viscosity latex which may be preferred.

By way of example and not limitation, it has been found that sufficient adhesion and penetration may be achieved through the application of approximately 12 ounces per square yard (wet weight) of latex adhesive having 50% solids and a viscosity of about 200 centipoise when heat actuated tacking is utilized. As will be appreciated, this level of adhesive application is significantly less than that required when no heat tacking is utilized. By way of example only, a bonded carpet fabric formed without the use of heat tacking would typically make use of about 50 ounces per square yard of wet latex with 50% solids having a viscosity of about 3000 centipoise. Further, the heat tacking process prevents substantial shifting of the yarn in relation to the base layer, thereby potentially enhancing the uniformity of the products produced.

Pile forming configurations may include the so-called I-tuft configuration, e.g., a non-folded configuration, U-tuft configurations, and loop pile configurations, among others. With regard to the phrase "folded, pile forming fashion," which refers to a preferred embodiment, it should be understood that what is intended is a configuration of the pile yarns where the yarns are provided with at least one fold at the portion of the yarn generally most nearly adjacent to the base layer, e.g., a cut pile configuration. Another "folded" configuration which is contemplated is a loop pile configuration where the pile yarns remain uncut in the form of substantially continuous folded yarns in the final product. A variety of pile configurations are illustrated in the attached drawings. According to the most preferred embodiment the pile yarns are cut to form a folded, cut pile product.

According to the method and apparatus of the present invention a pile forming yarn is preferably positioned in pile forming fashion adjacent to one side of a liquid-permeable base layer. Subsequent to the positioning of the pile forming yarn adjacent to one side of the liquid permeable base layer, heat is used to meltable tack the pile forming yarn to the base layer by fusion thereto. This tacking operation is preferably effected without the use of any adhesive. Further, this tacking operation is preferably performed by non-contact heating methods giving rise to radiant or convective heat transfer mechanisms rather than contacting methods such as plate heaters which operate primarily through conduction.

Following the tacking operation, an adhesive (preferably latex) is applied to the base layer on the opposite side of the base layer from the side adjacent to the pile forming yarn. According to the next step of the method the adhesive may be forced, either simultaneously with its application or in a separate step, through the base layer into bond forming contact with the pile forming yarn. The adhesive is then solidified by either heating or cooling depending on the type of adhesive used, thereby securely bonding the pile forming yarn to the base layer.

Solidification or curing of the adhesive is preferably accomplished by heating via a dual mode of non-contact heat transfer comprising the application of hot air at between about 200° F. and about 400° F. in combination with adjustable infrared heating. Total cure time may range from about 0 seconds to about 500 seconds depending on the level of preheat available from the tacking operation as well as the make-up and quantity of the adhesive used. For example, with a fairly high level of preheat and the application of a relatively low volume of adhesive, the cure may be virtually instantaneous.

According to a preferred embodiment of the present invention a method and apparatus are provided wherein two continuous, liquid-permeable base layers are positioned in a passage where they lie in substantial parallel relationship to one another at a predetermined distance from one another; at least one continuous pile forming yarn is driven by folder blades alternatively against the opposing surfaces of said base layers when they are at or near the entrance to the above mentioned passage in such a way as to position the pile forming yarn in abutting relation to the base layers and to fold it zig-zag; applying heat to the sandwich formed by said pile forming yarn between said base layers to tack said pile forming yarn to said base layers; thereafter applying to the back of said base layers an adhesive; forcing said adhesive through said base layers so that said adhesive contacts said pile forming yarn; and curing said adhesive to thereby bond said pile forming yarn to said base layers. This curing step in the method may accomplish an additional function, namely that of bonding the individual pile forming yarns to themselves typically at or near the portion of the yarns nearest the base layer, thereby imparting improved performance characteristics to the pile fabric product. Thereafter, the base layers may be separated from one another to form two continuous, adhesive bonded products. Typically such separation may be accomplished by means of a stationary or moving knife blade positioned between the base layers which cuts the pile yarns along the entire width of the joined base layers to provide the heat tacked adhesive bonded products.

The yarn used in forming the pile may be made of any type of fiber known to be useful for fusion bonded fabrics such as carpets. Fibers believed to be suitable include, for example, nylon, acrylics and polyester although other materials may be utilized.

Any of a wide variety of adhesives used as carpet backing adhesives for many years may be employed in connection with the present invention. Examples include hot melt adhesives as well as latex adhesives, acrylics, vinyl acetate, ethylene vinyl acetate, vinyl acrylate and the like. Styrenebutadiene (SBR) latex emulsions may be preferred.

The preferred SBR latex emulsion may be prepared in accordance with known procedures such as, for example, the polymerization of the respective monomers in appropriate proportions in an aqueous medium containing an emulsifying agent and a peroxide catalyst. An emulsion stabilizer, such as an anionic surface-active agent, is usually added during the polymerization process. The SBR latex is usually a binary copolymer of styrene and butadiene but copolymers incorporating a third or fourth monomer may also be utilized in this invention. A preferred latex in the carpet adhesive industry is a carboxylated styrenebutadiene polymer having a fairly high styrene content.

The emulsion usually contains about 50% water, by weight, but may contain more or less, e.g. from about 20% to about 75%. Extra water may be added in order to attain the desired working properties of the adhesive composition.

Other additives commonly used in carpet backing adhesives such as fillers, thickeners, anti-oxidants, anti-freeze compositions, fungicides, surfactants, corrosion inhibitors and colorants may be present in the carpet backing adhesives of this invention. Each additive must be selected carefully so that it is compatible with the prime ingredients of the composition and does not adversely affect the function of the other additives.

The carpet backing adhesive of this invention may be applied to the carpet by the techniques as are known to those of skill in the art. A lick-roll technique, a spreading technique and a spraying technique are described in "High Polymer Latices" (Applied Science Publishers, Ltd., 1966). As discussed more fully below, a spraying technique for the application of adhesive may be preferred. Suitable liquid-permeable base layers which may be employed in the product and process of the invention include woven fabrics, knitted fabrics, non-woven mats or scrims, felted materials, or even flexible, foraminous materials.

In the preferred embodiment, after the latex adhesive is applied by a spraying technique, the composite travels into a heating unit for solidification where the latex is cured and water is removed. In the past it was considered to be impossible to remove large amounts of water from the adhesive during the manufacture of a bonded type floorcovering product. It has been found, however, quite to the contrary, that the majority of the moisture actually travels into the yarn thereby causing the yarn to bulk as the liquid phase water is converted into steam in the heating unit just prior to removal of the steam through the exhaust fans. Thus, the moisture present in the latex adhesive is a benefit in terms of the properties of the final floorcovering product rather than a detriment.

As will be appreciated, if a hot melt or other adhesive with similar softening characteristics is used rather than latex, solidification will be effected by either passive or active cooling rather than by heating. In any event, regardless of the actual mechanism involved, the term solidification is used to connote the curing or substantial set up of the adhesive as a transformation is effected from a flowable form to a substantially solid non-flowable form.

Where it is desired to provide the adhesive bonded pile fabrics of the present invention as floor covering products, especially carpet tiles, it may be desirable to apply any of a wide variety of suitable, resilient backing layers to the fabric. Such carpet tiles are also considered to be within the scope of the present invention. The backing layer may be formed, for example, from a suitable thermoplastic or thermoset material such as blends containing ethylene/vinyl acetate copolymers, atactic polypropylene, bitumen, hydrocarbon resins, waxes, polyvinyl chloride compounds, synthetic and natural rubbers.

In the past, use of the preferred latex adhesives in the manufacture of bonded carpet tiles in particular was discarded because it was believed that the resilient backing layer, whether it be polyvinyl chloride, ethylene vinyl acetate, or even hot melt backing materials, would be incompatible with the latex adhesive. It has been found, however, quite to the contrary, that latex adhesives may be quite compatible with a wide variety of resilient backing layers by selecting the proper combination of latex adhesive composition, resilient backing layer composition and, furthermore, by imparting as much mechanical bond as possible by adding only the exact amount of adhesive to the yarns as may be necessary to achieve desired yarn bundle penetration. By so doing, voids are left between and around the yarn bundles for mechanical adhesion of the secondary backing material to the preformed composite.

The backing layer, which may be bonded to the pile layer by means of a separate adhesive, may be provided with at least one stiffening and stabilizing membrane, such as woven or nonwoven glass fibers. After the backing has been applied the consolidated material may then be severed by suitable cutting means into a carpet tile by any of a variety of techniques which are well-known to those skilled in the art.

The resulting carpet tile product may be printed and even subjected to further textile processing operations at relatively high temperatures without adversely affecting its physical properties. It is suitable for use as a floor covering in home and/or commercial use in an office environment where substantial high stress conditions (e.g., wheeled traffic) are applied across the tiles. The tiles typically have a dense pile and may not require adhesives for installation. The individual modules may be replaced or rotated as necessary or desired. The carpet tiles may also have excellent dimensional stability with substantially no curling, slipping, buckling, stretching or shrinking. In addition, the carpet tiles may have low smoke emission and low "fuzzing" characteristics.

The invention may be further understood by reference to the drawings and accompanying description thereof. It is to be understood, however, that various changes may be made without departing from the scope or spirit of the invention which is to be limited only by the scope of the appended claims. Referring now to the drawings:

FIG. 1 is an elevation view of a preferred embodiment of the apparatus of the present invention;

FIG. 1-A is a partial elevation view of a prior art apparatus;

FIGS. 2 through 6 illustrate various embodiments for applying adhesive through the base layer; and FIGS. 7 through 10 illustrate various pile forming configurations which may be employed in the adhesive bonded pile fabrics of the present invention;

FIG. 11 is a schematic in side view of a prior art apparatus of horizontal configuration.

FIG. 12 is a schematic in side view of an apparatus of the present invention having a horizontal configuration.

Referring now to FIG. 1, in a preferred embodiment, carpet yarn 10 is supplied from a yarn source (not shown) over and around guide rolls 12 and 14 and down to the vertical guides 16. Base layers 17 are supplied from rolls 18 into position between the guides 16. As the yarn 10 enters between the vertical guides 16 the folding blades 20 and 22 alternately displace the yarn in a zig-zag fashion into one or the other of the base layer sheets 17 as the carpet backing is being drawn downwardly. Pivotally mounted bladelets 24 and 26 may assist in the folding of the yarn. Folding blades 20 and 22 are mounted, respectively, to connecting rods 28 and 30. Connecting rod 28 is pivotally connected to pivot shafts 32 and 34 through suitable links (not shown), while the connecting rod 30 is pivotally connected to pivot shafts 36 and 38 in a like manner. The shafts 32 and 38 are oscillated by an oscillating crank arm mechanism (not shown).

It should be noted that the blade 20 is out of phase with the blade 22 so that when the blade 22 is being pivoted inwardly as shown in FIG. 1 the blade 20 is being pivoted outwardly and vice versa to provide a zig-zag configuration of the yarn between the carpet base layers 17 which are liquid-permeable, that is permeable to the adhesive to be applied.

After the carpet yarn 10 has been positioned in zig-zag configuration between the base layers 17, (but prior to the introduction of any external adhesive) energy from first heating units 39 is transported to the sandwich 21 formed by the carpet yarn 10 between the base layers 17. The first heating units 39 are preferably non-contacting heating devices. By non-contacting heating device is meant any heating device which does not rely primarily on contact conduction to effect heat transfer. While a number of heating devices are suitable, the first heating units 39 preferably comprise one or more quartz infrared tube heaters disposed across the full width of the base layers 17. One such unit which has been found to be suitable was supplied by GLENRO Incorporated, whose business address is believed to be 39 McBride Avenue, Paterson, N.J. 07501-1715.

The heat energy from the first heating units 39 causes the carpet yarns 10 and base layers 17 to slightly fuse together, preferably by means of a slight melting of the yarns 10, thereby tacking the base layers 17 to the carpet yarns 10. Due to this tacking, the sandwich 21 formed by the carpet yarns 10 within the base layers 17 is substantially stabilized, thus requiring no external support to stay together. This eliminates any need for contact between the sandwich 21 and supporting structures.

After the yarn has been positioned and tacked with heat to the carpet base layers 17, latex adhesive 40 is preferably applied and forced through the carpet base layers 17 by spray headers 42. In the preferred embodiment, an airless spray system with a single spray header 42 is disposed on each side of the sandwich 21 in the manner illustrated. Each of the spray headers 42 may preferably be traversely reciprocated to move back and forth across the exterior surface of the sandwich 21. One spray system which has been found to be suitable comprises a GRACO 20:1 pump in combination with a GRACO airless spray gun and DEIMCO spray gun reciprocator. This system is believed to be available for purchase from Air Products Company whose business address is believed to be 2027 Brookwood Road, Cummings, Ga., 30130.

After the latex adhesive has been applied to the carpet base layer and forced through it into contact with the carpet yarn, it may be converted into a substantially solidified form by second heating units 44 to form an adhesive bond between the carpet yarn 10 and the carpet base layer 17. The second heating units 44 may be supplied with infrared heaters 46 in combination with hot air from gas burner ducts (not shown) to heat the latex adhesive, thereby causing it to cure. In the illustrated and preferred embodiment, no contact is required between the base layer 17 and the second heating units 44.

Following passage of the sandwich 21 through the second heating units 44, the yarn 10 may be severed, generally in the middle of the base layers 17 by a cutting blade 48 to provide, simultaneously, two sheets of carpet. As illustrated, the carpet yarns 10 and base layers 17 are preferably drawn toward the cutting blade 48 by take-off wheels 50 which provide a degree of tensioning such that the base layers 17 are preferably free of lateral support as the sandwich 21 formed by the base layers 17 and carpet yarn 10 is passed through the first and second heating units 39 and 44.

It is thought that the tacking operation effected by the first heating units 39 provides a number of benefits. The tacking secures the carpet yarn 10 in a fixed relation to the base layers 17 at an early stage of the production process. The potential for incidents of shifting to occur between the carpet yarn 10 and the base layers 17 is therefore reduced. As will be recognized by those of skill in the art, the reduction of such shifting incidents is of benefit since such shifting may result in discontinuities between product lots from either side of the sandwich 21. The tacking operation also eliminates the need for support structures disposed along the length of the sandwich 21 formed by the carpet yarn 10 and the base layers 17.

As illustrated in FIG. 1A, rolls 55 have been previously used for the dual purpose of supporting non-tacked sandwich structures while promoting penetration of the latex 40 through the base layers 17. It has been found that through use of first heating units 39 (FIG. 1) to tack the carpet yarn 10 to the base layers 17, not only is support unnecessary, but the penetration function of the rolls is also unneeded due to the ability to use small amounts of such low viscosity latex adhesives having aqueous contents of between about 20% and about 75% and preferably of about 50% and viscosities of about 200 centipoise which can easily penetrate the base layers 17 without external assistance. These latex adhesives may be applied at a wide range of levels between about 4 and 70 dry ounces per square yard and preferably at a level of about 6 dry ounces per square yard.

FIG. 2 is an alternate latex adhesive applicator means for the embodiment shown in FIG. 1. The trough 100 is positioned underneath the applicator rolls 84 which are rotated in the direction of the movement of the fabric. The rate of application of the latex is controlled by doctor knife 102.

FIG. 3 is an alternate embodiment showing a trough 103 located at the side of applicator rolls 84. Rate of application of latex adhesive is controlled by doctor rolls 105.

FIG. 4 illustrates yet another embodiment wherein the latex adhesive 40 is contained in a trough 88 and is brought into contacting relation with the liquid permeable base layers 17 by applicator rolls 84.

FIG. 5 illustrates an alternative embodiment wherein the latex adhesive is maintained in a reservoir sided on one side by base layers 17 and on the other side by doctor blades 104. The adhesive 40 is allowed to contact the carpet backings and is forced therethrough by the tips 106 of doctor blades 104.

FIG. 6 illustrates yet another embodiment of the invention where the latex adhesive 40 is maintained in tanks 108. Application of the adhesive to the base layers 17 is accomplished by drawing the adhesive out of the tank 108 through pumps 110 into manifolds 112. The adhesive 40 is then forced from the opening 114 in manifolds 112 under sufficient pressure to force the adhesive through the carpet base layers 17 into contact with carpet yarn 10.

FIG. 7 illustrates an embodiment of the fabric of the present invention showing an I-tuft configuration of the pile yarns. Latex adhesive 40 is shown as a continuous layer into which the base layer 17 of a relatively open-weave, adhesive permeable fabric has become embedded at the base thereof where it has been tacked to the carpet yarn 10. Backing layer 150 is made of a thermoplastic material having a stabilizing layer of glass fibers 151 and is shown as having been bonded to the pile fabric by means of thermoplastic material. FIGS. 8, 9 and 10 illustrate some folded configurations of the pile forming yarns which may be preferred. Identifying numbers refer to the same structural components as in FIG. 7. FIG. 8 shows a folded, cut pile configuration. FIG. 9 shows a loop pile configuration. FIG. 10 shows another folded pile configuration where the folded portion of the yarn is on the surface giving the appearance of a loop pile, although the loops are not joined to one another at their base. This configuration provides in essence a loop pile product while simultaneously offering the advantages of, for instance, yarn savings of the so-called I-tuft configuration. In each of the FIGS. 7–10 it is intended to illustrate that the carpet yarn 10 has been tacked to the base layer 17.

FIG. 11 illustrates a schematic of a prior scheme for preparation of a fusion bonded carpet 200 wherein the operation is carried out in a substantially horizontal orientation. Such an operation is specifically described in U.S. Pat. No. 5,198,277 to Hamilton et el. issued Mar. 30, 1993. The operation essentially involves the application of adhesive latex 240 by means of a doctor blade 273 to secure a woven polyester 274 and glass fiber fleece 275 to the face of a partially formed carpet material 277. Subsequent to the application of the adhesive latex 240, heat is applied to cure the latex. As will be appreciated, such an operation does not utilize a heat tacking operation prior to the application of the adhesive 240.

It is to be understood that while the embodiments which have been illustrated and described in relation to the apparatus and method of the present invention have generally been shown as incorporating a vertical orientation, it is in no way intended that the invention be limited thereto.

By way of example only, FIG. 12 illustrates just one potential alternative embodiment where a horizontal configuration may be utilized. As shown, the embodiment of FIG. 12 incorporates means to effect heat tacking of yarn to a base layer 317. In this embodiment, a liquid permeable base layer 317 is supplied from a roll 318 and placed into contact with the yarn of a partially formed carpet material. Heat is thereafter applied from a heating unit 339 to lightly fuse the yarn to the base layer 317. Following this heat tacking operation, an adhesive 340 such as latex is applied through the liquid permeable base layer into contact with the yarn by means of an appropriate spray mechanism 342 as described above. The latex adhesive is subsequently cured through the application of heat after which the carpet is separated by a cutting blade 348 to form two sections.

It is thus to be understood that it is in no way contemplated that the present invention be limited to any particular orientation or configuration of elements. Rather, it is contemplated that the present invention include horizontal, vertical and other orientations as well as single sided or multi-sided applications of heat and/or adhesive. Accordingly, while specific embodiments of the invention have been shown and described, it is to be understood that the invention is not limited thereto, since modifications may be made and other embodiments may occur to those skilled in the art. Therefore, it is intended to include any such modifications and other embodiments as incorporate the features of this invention within the true spirit and scope of the appended claims.

The invention may be further understood by reference to the following example which is not to be construed as unduly limiting the invention.

EXAMPLE

Employing the apparatus substantially as illustrated in FIG. 1, liquid-permeable base layers were provided of non-woven glass scrim of 10 ends by 8 ends per inch. Into these base layers were positioned pile forming yarns of 3-ply Nylon 6,6, 1.92/3 open end spun yarn. The yarn was folded at about 7.5 folds per inch by 7 ends per inch face density construction. Web speed was about 16 inches/minute. After the yarn was folded in place it was tacked to the scrim base layer across about a 74 inch width by means of radiant energy delivered by full width infrared tube heaters. After the pile forming yarns were partially tacked to the base layers, a 50% solids, latex adhesive composition comprising an aqueous composition of styrenebutadiene having a viscosity of about 200 centipoise was applied at the rate of about 12 (wet) ounces/square yard using a traversing airless spray gun operating at approximately 600 PSI. Following the coating operation, the product was cured in a heating unit for about 3 minutes utilizing a combination of infrared radiation and convective heat transfer by means of hot air delivered at between about 200° F. and about 400° F. After approximately two minutes of ambient cooling, the cured product was slit forming two sections of cut pile carpet.

A pre-formed backing layer of filled amorphous resin (weighing about 50 ounces/square yard) was cast on a non-woven glass mat which was then laminated to the slit, latex adhesive bonded carpet by casting about 20 ounces/square yard of filled amorphous resin onto the backing layer and then immediately pressing the carpeting into this molten material by conventional means. The resulting product was allowed to cool and was then cut into carpet tiles and was suitable at that time for further processing, e.g. printing, steaming, washing and drying.

What is claimed is:

1. A method for forming an adhesive bonded pile fabric comprising the steps of:
    (a) placing pile forming yarn adjacent to and in contacting relationship with the surface of a liquid permeable base layer without tufting said yarn substantially through said base layer;
    (b) tacking said yarn to said base layer through the application of heat;
    (c) applying an adhesive through said base layer into contact with said yarn after said yarn has been tacked to said base layer; and
    (d) solidifying said adhesive while in contact with said yarn such that said yarn is bound to said base layer.

2. The method of claim 1 wherein the tacking in step (b) is carried out by non-contacting heating units.

3. The method of claim 2 wherein said non-contacting heating units comprise a plurality of radiant heaters.

4. A method for forming an adhesive bonded pile fabric comprising the steps of:
    (a) feeding first and second continuous, liquid-permeable base layers between guides whereby said base layers lie spaced one from the other in substantially parallel relation;
    (b) folding a continuous pile forming yarn against opposing surfaces of said base layers while said base layers are fed through said guides such that said pile forming yarn is disposed in zig-sag fashion against said base layers but are not tufted substantially through said base layers;
    (c) tacking said pile forming yarn to said base layers through the application of heat;
    (d) applying a latex adhesive through said base layers and into contact with said yarn after said yarn has been tacked to said base layers;
    (e) solidifying said adhesive while in contact with said yarn; and
    (f) cutting said yarn between said first and second base layers to form two continuous bonded pile fabrics.

5. The method of claim 4 wherein the tacking step is carried out by means of non-contacting heating units disposed adjacent said first and second base layers.

* * * * *

UNITED STATES PATENT AND TRADEMARK OFFICE
CERTIFICATE OF CORRECTION

PATENT NO. : 5,567,257
DATED       : October, 22, 1996
INVENTOR(S) : Kenneth B. Higgins and Benjamin A. Gaddis It is certified that error appears in the above-identified patent and that said Letters Patent is hereby corrected as shown below:

Column 10, Line 40 - the word "zig-sag" should be changed to "zig-zag".

Signed and Sealed this

Eighteenth Day of August, 1998

Attest:

BRUCE LEHMAN

Attesting Officer

Commissioner of Patents and Trademarks